US010447813B2

(12) United States Patent
Lin

(10) Patent No.: US 10,447,813 B2
(45) Date of Patent: Oct. 15, 2019

(54) MOBILE APPLICATION ACCELERATION VIA FINE-GRAIN OFFLOADING TO CLOUD COMPUTING INFRASTRUCTURES

(71) Applicants: Intel Corporation, Santa Clara, CA (US); Chit Kwan Lin, New York, NY (US)

(72) Inventor: Chit Kwan Lin, New York, NY (US)

(73) Assignee: Intel Corporation, Santa Clara, CA (US)

(*) Notice: Subject to any disclaimer, the term of this patent is extended or adjusted under 35 U.S.C. 154(b) by 265 days.

(21) Appl. No.: 15/113,026

(22) PCT Filed: Mar. 10, 2015

(86) PCT No.: PCT/US2015/019776
§ 371 (c)(1),
(2) Date: Jul. 20, 2016

(87) PCT Pub. No.: WO2015/138504
PCT Pub. Date: Sep. 17, 2015

(65) Prior Publication Data
US 2016/0344844 A1 Nov. 24, 2016

Related U.S. Application Data

(60) Provisional application No. 61/950,758, filed on Mar. 10, 2014.

(51) Int. Cl.

| | |
|---|---|
| ***H04L 29/08*** | (2006.01) |
| ***H04L 29/06*** | (2006.01) |
| ***G06F 9/50*** | (2006.01) |

(52) U.S. Cl.
CPC ............ *H04L 67/34* (2013.01); *G06F 9/5027* (2013.01); *H04L 67/02* (2013.01); *H04L 67/10* (2013.01);
(Continued)

(58) Field of Classification Search
CPC . H04L 67/1097; H04L 67/02; H04L 12/4633; G06F 15/16; G06F 11/0709
(Continued)

(56) References Cited

U.S. PATENT DOCUMENTS

| | | | | |
|---|---|---|---|---|
| 3,560,662 A * | 2/1971 | Casella | .................. | H04Q 11/04 370/522 |
| 8,194,088 B1 * | 6/2012 | Paquette | ................. | G06T 11/40 345/545 |

(Continued)

OTHER PUBLICATIONS

Office Action dated Jun. 5, 2017 for Canadian Patent Application No. 2,938,697, 5 pages.

(Continued)

*Primary Examiner* — Tesfay Yohannes
(74) *Attorney, Agent, or Firm* — Schwabe, Williamson & Wyatt, P.C.

(57) ABSTRACT

Apparatuses, Methods and Storage Media associated with offloading aspects of processing of mobile devices are disclosed. In embodiments, a mobile computing device may comprise one or more processors; memory coupled with the one or more processors; and a shim layer to compressively replicate memory blocks of the memory to a cloud server, compressively offload invocations of object methods of objects resident in a memory block of the memory to the cloud server, and to receive execution results of the invoked object methods. Other embodiments may be described and/or claimed.

27 Claims, 9 Drawing Sheets

(52) U.S. Cl.
CPC ........ *H04L 67/42* (2013.01); *G06F 2209/509* (2013.01)

(58) Field of Classification Search
USPC .................................. 709/219, 231; 375/150
See application file for complete search history.

(56) References Cited

U.S. PATENT DOCUMENTS

| | | | | |
|---|---|---|---|---|
| 8,489,760 | B2 * | 7/2013 | Visharam | H04N 21/2343 709/217 |
| 8,831,121 | B1 * | 9/2014 | Qi | H04L 27/2653 375/260 |
| 2003/0084435 | A1 | 5/2003 | Messer et al. | |
| 2006/0184998 | A1 * | 8/2006 | Smith | H04L 12/4679 726/3 |
| 2008/0219579 | A1 * | 9/2008 | Aksyuk | G02B 26/06 382/248 |
| 2009/0249001 | A1 * | 10/2009 | Narayanan | G06F 1/3203 711/161 |
| 2010/0061427 | A1 * | 3/2010 | Lopez-Risueno | G01C 21/206 375/150 |
| 2011/0117956 | A1 * | 5/2011 | Levi | H04B 1/0003 455/552.1 |
| 2011/0246814 | A1 * | 10/2011 | Agapi | H04L 45/586 714/4.1 |
| 2012/0294456 | A1 * | 11/2012 | Jiang | H04R 3/005 381/92 |
| 2013/0156283 | A1 * | 6/2013 | Beg | G01N 21/4795 382/131 |
| 2013/0238690 | A1 | 9/2013 | Kashyap | |
| 2014/0337408 | A1 * | 11/2014 | Workman | H04L 67/06 709/203 |

OTHER PUBLICATIONS

International Preliminary Report on Patentability dated Sep. 22, 2016 for International Application No. PCT/US2015/019776, 9 pages.

International Search Report and Written Opinion dated Jun. 1, 2015 for International Application No. PCT/US2015/019776, 12 pages.

Seungjun Yang et al., "Fast Dynamic Execution Offloading for Efficient Mobile Cloud Computing", 2013 IEEE International Conference on Pervasive Computing and Communications (PerCom), San Diego, Mar. 18-22, 2013.

Wei-Tsung Su et al.," Mobile Cloud with Smart Offloading System", 2013 2nd IEEE/CIC International Conference Communications in China (ICCC): Wireless Networking and Applications (WNA), pp. 680-685.

* cited by examiner

MOBILE APPLICATION ACCELERATION VIA FINE-GRAIN OFFLOADING TO CLOUD COMPUTING INFRASTRUCTURES

RELATED APPLICATION

The present application claims priority to U.S. Provisional Application No. 61/950,758, entitled "Mobile Application Acceleration Via Fine-Grain Offloading to The Cloud," filed Mar. 10, 2014.

CROSS REFERENCE TO RELATED APPLICATIONS

The present application is a national phase entry under 35 U.S.C. § 371 of International Application No. PCT/US2015/019776, filed Mar. 10, 2015, entitled "MOBILE APPLICATION ACCELERATION VIA FINE-GRAIN OFFLOADING TO CLOUD COMPUTING INFRASTRUCTURES", which designated, among the various States, the United States of America, and claims priority to U.S. Provisional Application No. 61/950,758, entitled "Mobile Application Acceleration Via Fine-Grain Offloading to The Cloud," filed Mar. 10, 2014. The Specifications of the PCT/US2015/019776 and 61/950,758 Applications are hereby incorporated by reference.

TECHNICAL FIELD

The present disclosure is generally related to the field of computing, more specifically, to apparatuses, methods and storage media associated with mobile devices offloading aspects of processing to a cloud computing infrastructure.

BACKGROUND

The limitations of mobile device hardware can significantly restrict what mobile applications can do. Despite the arrival of multi-core processors and GPUs on smartphones, tablets, and other user equipment, the growing sophistication of mobile applications routinely pushes against the processor and battery limits of modern mobile devices. Some special-purpose systems, such as web services like Siri and Google Now, have started to mitigate these constraints by offloading some computations to the cloud. However, these web services generally preclude shifting arbitrary workloads to the cloud. At present, there is currently no principled way for application developers to have a unified application codebase that can run on both the device and the cloud. Just as in Siri, application developers may be required to statically partition their application into device-specific and cloud-specific components. Once implemented, this partitioning may not be changed easily or dynamically, rendering runtime optimization impossible.

DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

DETAILED DESCRIPTION

Figure 1:
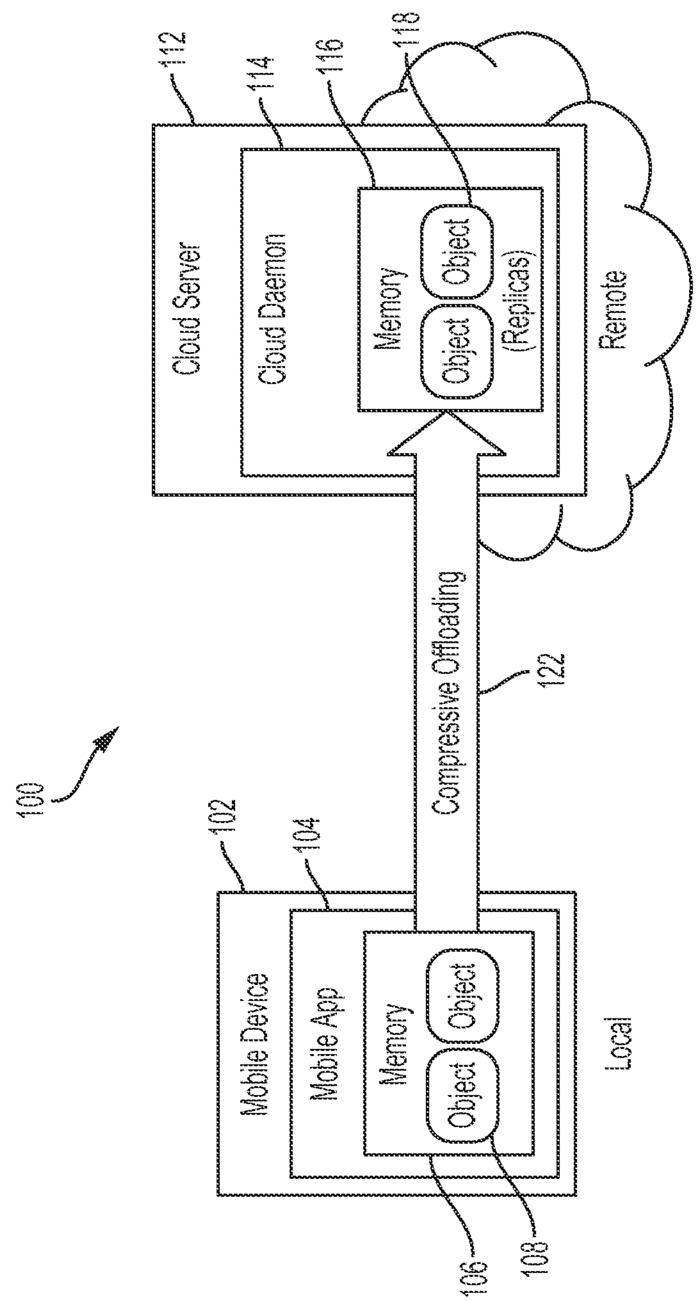
FIG. 1 depicts an example system incorporated with the mobile device offloading technology of the present disclosure, in accordance with some example embodiments.

Apparatuses, methods and storage media associated with mobile devices offloading aspects of processing to a cloud are disclosed herein. A strategy for removing hardware constraints of mobile devices may be to opportunistically offload computations to one or more servers in the cloud, where more capable hardware can do the heavy lifting associated with computation and the like. The subject matter disclosed herein relates to a platform for dynamically and transparently shifting arbitrary, fine-grain workloads from a mobile device up to a cloud computing infrastructure. The platform may accomplish this through compressive offloading (which is generally based on compressive sensing). The offloading provided by the platform disclosed herein may, in some example implementations, provide an order-of-magnitude acceleration and 60% longer battery life for the end user equipment (for example, a smartphone, tablet, and any other processor-based device) including a mobile application, such as a handwriting recognition application and the like. Offloading may not only be beneficial to end user equipment, but also to cloud providers—the former may experience a performance boost and the latter may receive a steady stream of small computations to flexibly fill periods of under-utilization.

The subject matter disclosed herein may provide a general, reusable framework for mobile devices to dynamically shift arbitrary, fine-grain workloads up to the cloud at runtime. The fine granularity may provide on-the-go mobile users with high system responsiveness. A fine partitioning of work (e.g., at the level of an object method invocation) may incur less disruption to the user equipment in the event the device becomes disconnected from the cloud and a local restart of the task is required. Fine-grain workloads may also offer cloud service providers a way to maximize the utilization of their cloud infrastructure by providing a ready stream of small jobs that can be flexibly used to fill troughs in utilization. Both parties can derive significant benefit from these kinds of workloads due to the disparity in the hardware resources each commands—the end user equipment/user may view the work as computationally complex and is more than happy to have it accelerated by someone else, while the cloud provider perceives the work as computationally cheap, but useful for leveling out utilization.

To extract these gains, embodiments of the present disclosure require that the mobile device and the cloud behave as a single, tightly coupled system, i.e., embodiments of the present disclosure cast the mobile devices and the cloud as a distributed shared memory (DSM) system, in which memory on the local mobile device is continuously replicated to a remote cloud server. Any object resident in local memory may thus have a replica on the cloud-base server and any method invoked on a local object may be transparently redirected to a remote copy for faster execution on more capable cloud hardware, to be described more fully below.

In the following detailed description, the mobile device offloading technology will be described with references to the accompanying drawings which form a part hereof, wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now FIG. 1, wherein a system incorporated with the mobile device offloading technology of the present disclosure, according to various embodiments, is shown. As illustrated, in the example system 100 of FIG. 1, compressive offloading uses compressive sensing to tightly replicate a memory block 106 (of a mobile application 104) and its resident objects 108 from a mobile device 102 to a cloud server 112, resulting in object replicas 118 created in memory 116 of cloud daemon 114. Each object 108 and its replicas may include the object's variables and methods. Accordingly, local method invocations may thus be transparently redirected to the remote object replicas 118 in remote memory 116 (e.g. of cloud daemon 114 of cloud server 112) for faster execution by more capable cloud-based hardware, software, and/or a combination of both. In a sense, memory 106 and memory 116 can be considered a DSM. Thus, allocating objects from this DSM becomes a principled way for application developers to program the cloud in a lightweight way. However, implementing such a DSM is not trivial due to the constraints on latency, network bandwidth, power, and computation overhead imposed by the mobile device. This is further complicated by the fact that memory input/output (I/O), which is direct and random-access, is typically not naturally amenable to standard, efficient transaction logging techniques. Existing replication methods that, e.g., rely on communicating and comparing hashes to identify delta offsets and to generate a delta encoding, can have high computation and network overheads and thus do not respect the resource constraints listed above.

The subject matter disclosed herein may thus provide a platform that uses compressive sensing to realize the tight coupling necessary for dynamically shifting arbitrary, fine-grain workloads from a mobile device to the cloud. Further described below are an example implementation for the core compressive offloading mechanism, a prototype implementation on an operating system (for example, iOS and the like), and an initial performance evaluation of the system.

In embodiment, compressive offloading 122 may be based generally on compressive sensing. Compressive sensing is a sub-Nyquist random sampling technique in which a signal $s \in R^N$ with sparsity rate k/N (i.e., only k coefficients in s are non-zero) is sampled or encoded by an M×N linear operator $\Phi$ (called the sampling matrix) to produce samples $y \in R^M$. When $\Phi$ is a random matrix, and $M=O(k \log(N/k))$, i.e., $M<<N$, s can be exactly recovered or decoded by using convex optimization to solve the $l_1$-minimization problem $$\min_{s \in R^N} \|s\|_{\ell_1} \text{ subject to } y = \Phi s, \tag{1}$$

or by using other methods, including so-called greedy methods.

Figure 4:
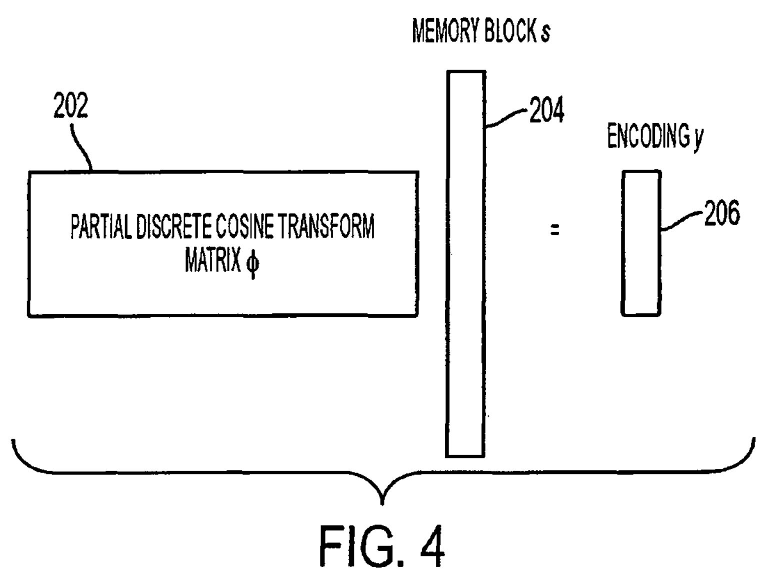
FIG. 4 illustrates compressive replication encoding, in accordance with example embodiments.

Accordingly, under the present disclosure, fast and network-efficient memory replication may be achieved via compressive sensing. Referring also to FIG. 4, wherein compressive replication encoding is shown. As illustrated, memory block s 204 may be encoded into encoding y 206 by applying matrix Φ 202, e.g., a partial discrete cosine transform to memory block s 204. Memory I/O (i.e., deltas to memory) typically constitutes a sparse signal that can be compressively sampled. This approach, referred to herein as compressive replication, may, in some implementations, have one or more advantages. For example, compressive replication may require no network overhead to determine the deltas and their offsets because these are automatically recovered during decoding. Moreover, compressive replication may be resource-commensurate because the encoder on the mobile device has low computational complexity while the decoder on the cloud server has higher complexity.

On system startup, both the local and remote ends (mobile device 102 and cloud server 112) may be configured to know the sampling matrix D, the sparsity rate setting k/N, and that a length N memory block, whose byte values are represented by $s_0$, is already synchronized; both local and remote can thus calculate $y_0=\Phi s_0$. At some later point in time, a process on the mobile device may modify the contents of the local memory block. When k elements have changed, we denote the state of the block as $s_1$ and encode it by calculating $y_1=\Phi s_1$. This encoding is then transmitted over the network to the cloud server. On receipt, the cloud server calculates $y'=y_0-y_1$, which satisfies the equation $$\begin{aligned} y' &= y_0 - y_1 \\ &= \Phi s_0 - \Phi s_1 \\ &= \Phi(s_0 - s_1), \end{aligned} \tag{2}$$

wherein the unknown quantity $s_0-s_1$ is the delta encoding sought to be recovered. The solution to this can be found using convex optimization, iterative greedy algorithms based on matching pursuit, message passing algorithms, iterative hard thresholding methods, and/or the like. Once solved, $s_0-s_1$ can be subtracted from $s_0$ to obtain $s_1$. By extension, a subsequent set i of k new updates to the local block will generate a new compressive sample $y_i$. Upon receipt of this, the remote end calculates $y_{i-1}-y_i$ and applies the same decoding scheme above to recover $s_i$.

For the disclosed system, minimizing replication latency may be a goal since latency dictates the granularity of the work that can be offloaded. For example, if replication updates take 5 seconds (s) to complete, then all work that completes in less than 5 s on a user equipment, such as a tablet, smartphone, and/or the like, would receive no (or little) benefit from offloading. Replication latency may include three delays: encoding time, network transmission time, and/or decoding time.

The choice of the sampling matrix Φ may impact the encoding time, especially on resource-constrained user equipment, such as mobile device hardware. In practice, encoding with random sampling matrices, such as those with coefficients drawn at random from Gaussian or Bernoulli distributions, may require matrix multiplication, which may be too slow for use on mobile device hardware. An M×N partial discrete cosine transform (pDCT) (i.e., an N×N type-II DCT matrix with N−M rows deleted) may, in some implementations, perform better than other approaches because its uses a Fast Fourier Transform (FFT) under the hood and is thus fundamentally faster than a straight matrix multiplication. In some implementations, using the FFT directly instead of the DCT may result in an even faster encoding operation.

Network transmission time may be minimized by having the mobile device further compressing a pDCT encoding, provided that the time taken to compress and decompress does not add significantly to the overall replication latency. In some implementations, the fastest compression and decompression of a pDCT encoding may be achieved using the snappy algorithm.

On the cloud server side, using an accelerated iterative hard thresholding (AIHT) decoding algorithm may provide a short decoding time, mainly because AIHT eschews costly matrix inversions at each iteration, unlike basis pursuit (e.g., $l_1$-minimization) or matching pursuit algorithms. To extract even greater decoding speed, the disclosed system may implement AIHT in CUDA or OpenCL to take advantage of GPU hardware acceleration. This may provide an additional, attractive category of fine-grain computations that cloud providers could use to improve utilization of their more expensive GPU hardware.

The specific combination of using pDCT encoding, snappy compression/decompression and/or AIHT decoding may, in some implementations, reduce replication latency from the user equipment to the cloud to the point that makes compressive replication tractable on mobile device hardware.

In the disclosed system, the local mobile device end may manage multiple memory blocks simultaneously and replicate each to the remote end independently. These memory blocks may be of the same or different size N, and may each have a different sampling matrix Φ and sparsity rate setting k/N. Each memory block may be designated to store objects with sizes falling within a distinct range. For example, three memory blocks of size N=64 KB may be replicated independently: Block 1 may be used to allocate objects of 1 KB or smaller, Block 2 for objects larger than 1 KB but smaller than 4 KB, and Block 3 for objects greater than 4 KB but less than 64 KB.

Figure 5:
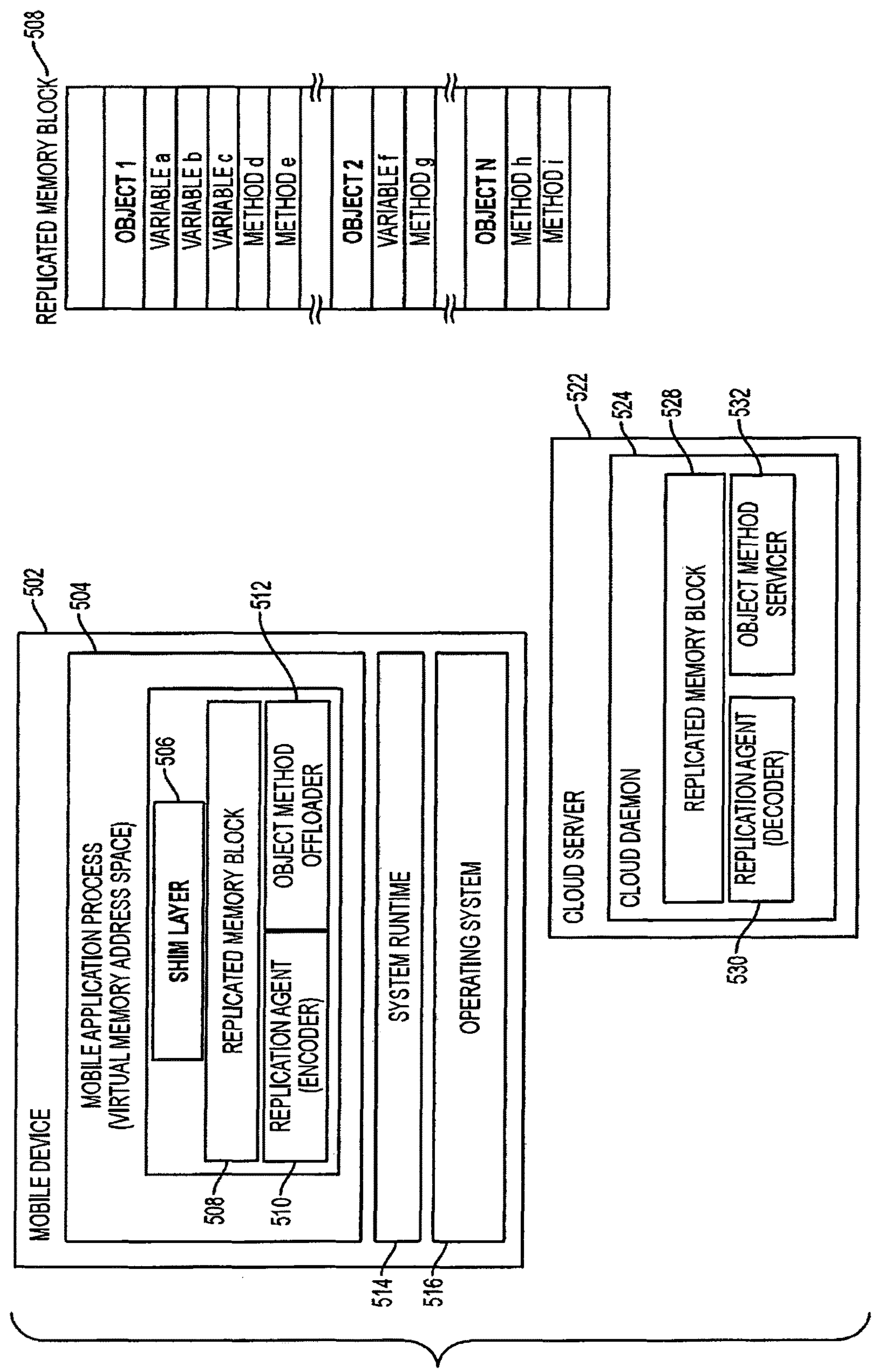
FIG. 5 illustrates the mobile device and cloud server of FIG. 1 in further detail, in accordance with example embodiments.

Referring now to FIG. 5, wherein the mobile device and cloud server of FIG. 1 are illustrated in further detail, in accordance with example embodiments. In embodiments, compressive replication may be performed continuously and/or periodically in the background, and computation offloading may be controlled and managed by two system components. On the mobile device 502, a shim layer 506 may be introduced into the mobile application process (virtual memory address space) 504 operating on top of runtime environment 514 that (1) manages the allocation and deallocation of objects from the replicated memory blocks 508; (2) serves as the replication agent (encoder) 510 and (3) serves as the object method offloader 512 to intercept and manage the redirection of object method invocations to the cloud server 522. As earlier described, replicated objects in replicated memory blocks 508 may include variables and methods of the objects. On the cloud server 522, a daemon 524 (1) may include a replication agent (decoder) 530 to decode and apply updates to its replica memory block(s) 528 and (2) an object method servicer 532 to service the offloaded object method invocations. In some embodiments of this system, where bidirectional replication is supported, strong consistency semantics may be used. In some other embodiments, issues of data consistency can be avoided by limiting to unidirectional replication from the mobile device to the cloud server. This may allow a simple versioning for each memory block (encoding the block increments the version), although other versioning approaches may be used as well. On the mobile device/user equipment, the shim layer 506 tags object method invocations with the version at the time of invocation. At the daemon 524, offloaded method invocations and replica updates may be queued and serviced in version order.

In addition to mobile application process 504, system runtime 514 and operating system 516, mobile device 502 may include one or more single or multi-core processors, volatile and/or non-nonvolatile memory, mass/persistent storage, input/output devices (such as keyboard, cursor control device, display (e.g., touch sensitive display), and/or wired or wireless networking/communication interfaces, known in the art. Volatile and/or non-nonvolatile memory, and mass/persistent storage may be referred to as computer-readable storage medium. Similarly, in addition to cloud daemon 524, cloud server 522 may include one or more single or multi-core processors, volatile and/or non-nonvolatile memory, mass/persistent storage, input/output devices (such as keyboard, cursor control device, display (e.g., touch sensitive display), and/or wired or wireless networking/communication interfaces, known in the art. These elements may vary and differ in size/capacity/capability, depending whether they are employed on mobile device 502 or cloud server 522. In other words, except for the compressive offloading technology of the present disclosure, mobile device 502 and server 522 may be, otherwise, any one of a number of mobile devise/servers known in art. Examples of mobile devices may include, but are not limited to, wearable devices, mobile phones, e-readers, tablets, laptops, and so forth. Examples of servers may include, but are not limited to, standalone or blade servers. Further, while for ease of understanding, shim layer 506 has been described as having replication agent (encoder) 510 and object method offloader 512, and cloud daemon 524 as having replication agent (decoder) 530 and object method servicer 532, in embodiments, replication agent (encoder) 510 and object method offloader 512 may share some of their common functions, or utilize services of operating system 516. Similarly, replication agent (decoder) 530 and object method servicer 532 may share are some of their common functions, or utilize services of the operating system (not shown) of cloud server 522.

Figure 6:
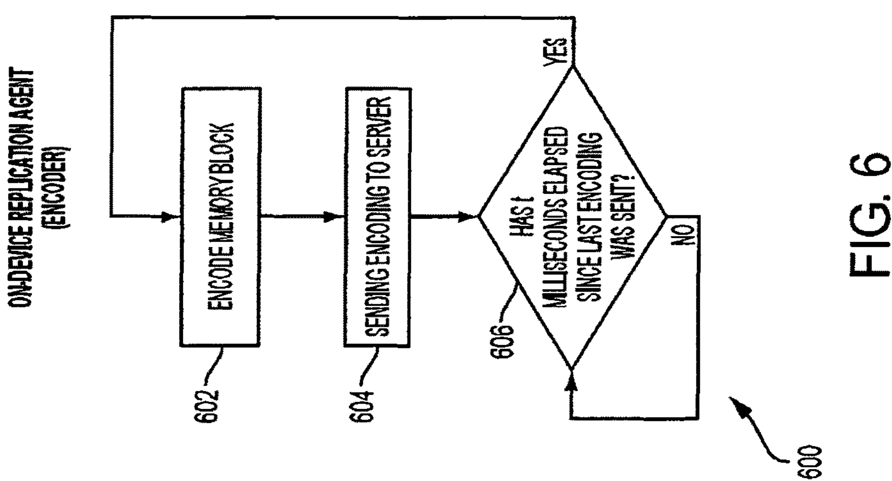
FIG. 6 illustrates an example client-side replication process, in accordance with example embodiments.

Referring now to FIG. 6, wherein a flow diagram illustrating an example client-side replication process, in accordance with example embodiments, is shown. As illustrated, process 600 for replication of memory blocks may include operations performed at blocks 602-606. Process 600 may be performed e.g., by the earlier described replication agent (encoder) of the shim layer of the mobile device. In alternate embodiments, process 600 may be performed with more or less operations, or some operations combined.

As shown, process 600 may start at block 602. At block 602, a memory block may be compressively encoded as earlier described. At block 604, the encoding may be sent to a cloud server. At block 606, process 600 may pause for t milliseconds (which may be a configuration parameter). On determination/expiration of the pause/wait period, process 600 may return to block 602 and continue therefrom, as earlier described. Process 600 may operate continuously as described, until offloading is disabled or the host mobile device enters a sleep state or power off state.

Figure 7:
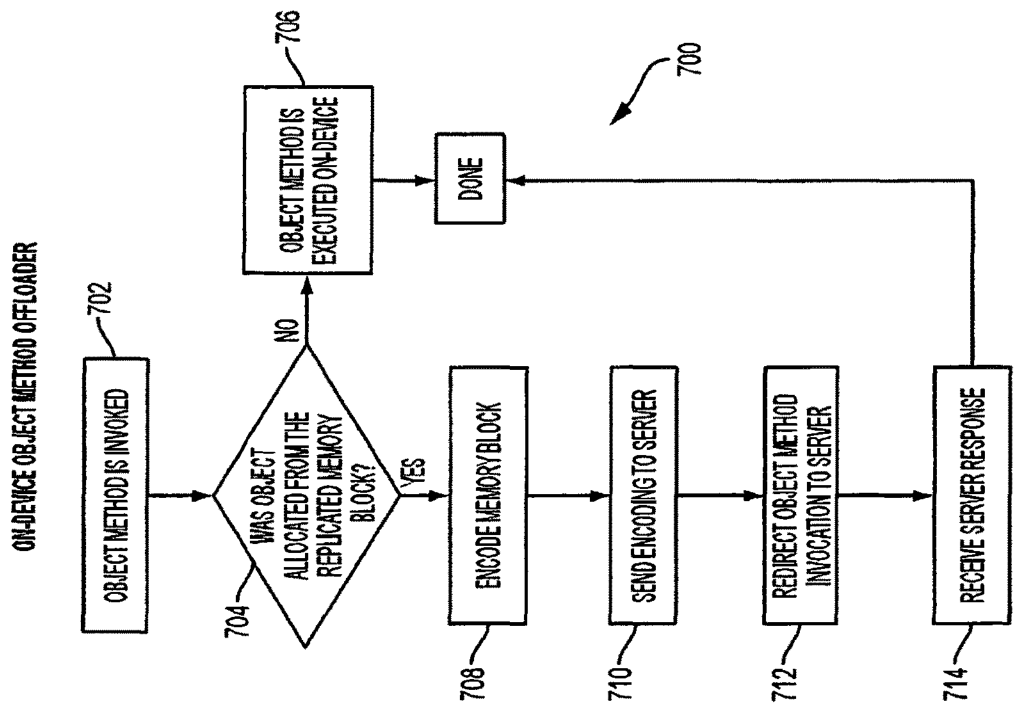
FIG. 7 illustrates an example client-side offloading process, in accordance with example embodiments.

FIG. 7 illustrates an example offloading process, in accordance with example embodiments. As illustrated, process 700 for offloading of methods may include operations performed at blocks 702-714. Process 700 may be performed e.g., by the earlier described offloader of the shim layer of the mobile device. In alternate embodiments, process 700 may be performed with more or less operations, or some operations combined.

As shown, process 700 may start at block 702. At block 702, an invocation of an object method may be detected. Next, at block 704, a determination may be made on whether the object was allocated from a replicated memory block. If a result of the determination indicates the object was not allocated from a replicated memory block, process 700 may proceed to block 706. At block 706, the object method may be executed on device. Thereafter, process 700 may end.

On the other hand, if a result of the determination indicates the object was allocated from a replicated memory block, process 700 may proceed to block 708. At block 708, the memory block may be encoded. Next, at 710, the encoding may be sent to a cloud server. Then, at block 712, object method invocation may be redirected to the cloud server. At block 714, response from the cloud server containing results of the object method invocation may be received. Thereafter, process 700 may end.

Figure 8:
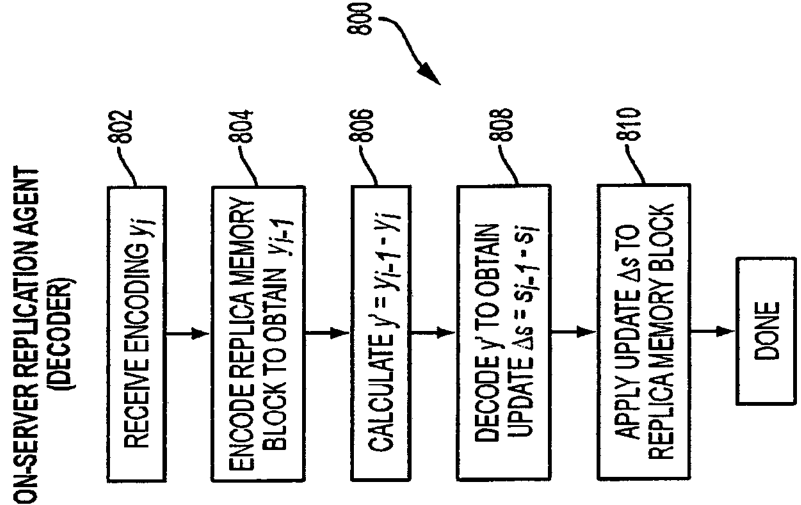
FIG. 8 illustrates an example server-side replication process, in accordance with example embodiments.

FIG. 8 illustrates an example replication process of the replication agent (decoder) of the cloud server of FIG. 5, in accordance with example embodiments. As illustrated, process 800 for replication of memory blocks may include operations performed at blocks 802-810. Process 802 may be performed e.g., by the earlier described replication agent (decoder) of the daemon of the cloud server. In alternate embodiments, process 800 may be performed with more or less operations, or some operations combined.

Process 800 may start at block 802. At block 802, encoding y, may be received. Next, at block 804, replica memory block may be encoded to obtain encoding $y_{i-1}$. At block 806, y' may be calculated by calculating the difference of $y_{i-1}-y_1$.

At block 808, y' may be decoded to obtain Δs, which is equal to the difference of $s_{i-1}-s_i$. Next, at block 810, update Δs may be applied to replica memory block.

Figure 9:
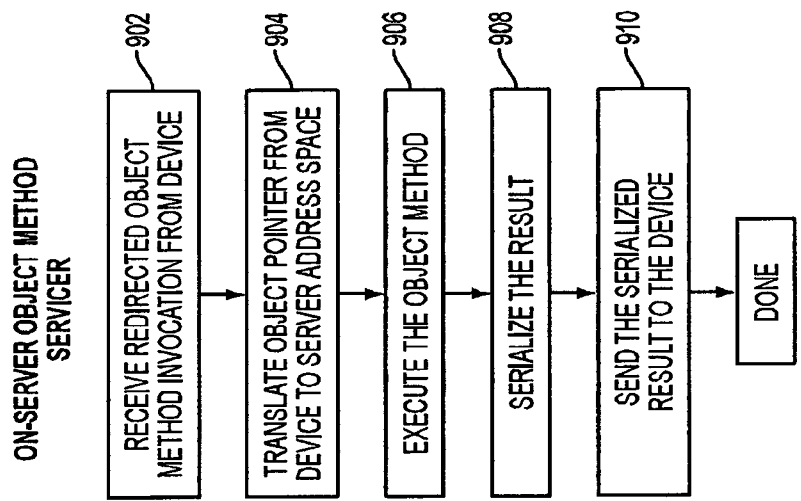
FIG. 9 illustrates an example service process, in accordance with example embodiments Like labels are used to refer to same or similar items in the drawings.

FIG. 9 illustrates an example service process, in accordance with example embodiments. As illustrated, process 900 for servicing a redirected object method invocation may include operations performed at blocks 902-910. Process 902 may be performed e.g., by the earlier described object method servicer of the daemon of the cloud server. In alternate embodiments, process 900 may be performed with more or less operations, or some operations combined.

Process 900 may start at block 902. At block 902, an object method redirection may be received from a mobile device. Next, at block 904, the address of object pointer may be translated from the device address space to the server address space. At block 906, the redirected object method may be executed.

On execution of the redirect object method, at block 908, the results of the execution may be serialized. At block 910, the serialized result may be sent to the mobile device, where the object method was initially invoked (prior to redirection). Thereafter, process 900 may end.

The offloading mechanism shares similarities with traditional RPC systems, but has a difference in that object marshaling, which is typically slow and therefore negatively impacts perceived system responsiveness, is supported but not the primary way in which methods and method parameters are passed to the remote end. Instead, since objects in memory are already replicated in the background and since the disclosed system components may control the entire replication and offloading process at both local and remote endpoints, the disclosed system may be able to pass pointers and perform address translation wherever appropriate. This means the disclosed system may, in some implementations, handle only heap-allocated pure objects. In some other implementations, it may handle both stack-allocated and heap-allocated objects that are either pure or composite.

The disclosed system may be configured to only perform compressive offloading if the end user equipment/user has given permission via a system preference setting on the mobile device/user equipment. But once permission is given, the system may decide when to perform the offloading. At a basic level, it only does so when proper network conditions exist. The system may include methods to determine whether the network conditions are proper. Beyond this, the decision to offload can also take into account other factors. For instance, the system might prefer to offload in order to stretch the device's battery budget, or the cloud provider might send a backpressure signal to limit offloading when its data centers are heavily loaded.

The following provides an example implementation consistent with the above, although other implementations may be realized consistent with the subject matter disclosed herein.

The disclosed system architecture described above may be considered device agnostic and may be applied to platforms supporting interpreted languages such as JavaScript or compiled languages such as Objective-C and the like. In an example implementation, a system includes an iOS ecosystem, using an iPad 3 running iOS 6.1.3 as the mobile device/user equipment and an Amazon EC2 g2.2xlarge instance in us-east-1a running Ubuntu 12.04LTS as the cloud server, although other hardware and/or software may be used as well. Moreover, although some of the examples described herein refer to mobile devices, the devices may be stationary as well.

Targeting the iOS ecosystem may provide some technical advantages since it uses Objective-C, which is a superset of C. The disclosed system may thus have a level of access low enough to perform its own memory management. The shim layer may be implemented as a software library (libupshift) against which an iOS application links. The shim may implement a memory manager which makes an initial block allocation out of the app's process heap and then privately manages this block for object allocation and deallocation. Replicating this memory may be possible because (1) modern ARM processors (e.g., the iPad 3's Cortex-A9) are bi-endian and are therefore byte order-compatible with x86 Amazon servers; and (2) the disclosed system may manage its own memory, so there is some control over byte alignment and padding. At present, the disclosed system may use pure Objective-C objects, which are allocated out of the memory by using the upshift_alloc object method instead of the Objective-C root object's alloc method, although other methods may be used. Whereas the alloc method allocates an object from the application process heap memory, the upshift_alloc object method allocates an object out of the memory that is privately managed by the shim layer. The default alloc may be overridden by using a replacement Objective-C category method. Redirecting method invocations may be handled by libupshift at runtime via method swizzling: Objective-C is late-binding, so method implementations may be replaced at runtime with a libupshift method that offloads the invocation over the network to the cloud daemon.

When an iOS app is compiled, any objects allocated with upshift_alloc are also cross-compiled for the Amazon EC2 environment. In the disclosed system, we abstract app code requiring this cross-compiling into separate modules and perform the cross-compiling. The resulting library may be dynamically loaded by the daemon and would provide class definitions for objects that are in the disclosed system server's replica memory. Since Objective-C objects are actually just C structs, they can be made accessible on the daemon after address translation and pointer casting.

The mobile device and cloud server may communicate using a custom application-layer network protocol (the UpShift protocol) that uses the Transmission Control Protocol (TCP) or another reliable transport protocol, such as a datagram protocol based on the User Datagram Protocol (UDP), as its underlying transport protocol. The transport layer may be encrypted (e.g., via TLS or SSL), and may thus provide cryptographic security for the application-layer UpShift protocol. The UpShift protocol header may include fields designating a unique protocol identifier, a protocol version number, a message type, and/or a message length. At a minimum, the UpShift protocol may support one or more of the following message types:

- Authentication request: This is sent from the shim to the cloud daemon and may transmit authentication credentials to the cloud infrastructure.
- Authentication response: This is sent from the cloud daemon in response to an authentication request from a shim. It may inform the shim whether the presented authentication credentials are valid.
- Initialization: This is sent from the shim to the cloud daemon. It may specify the unique identifier for the shim, the number and size of each memory block to be replicated, the sampling matrix $\Phi$ and sparsity rate k/N for each memory block, and a list of object types that an application may instantiate. When received by the daemon, the daemon may (1) allocate and initialize the replica memory blocks, and (2) initialize its offloading environment by loading the dynamically linked libraries that define the listed object types.
- Shutdown: This is sent from the shim to the cloud daemon. It may specify the unique identifier for the shim layer and may cause the daemon to (1) unload any dynamically linked libraries it loaded on initialization, and (2) deallocate the memory blocks it allocated on initialization.
- Replication Update: This is sent from the shim to the cloud daemon. It may specify a memory block (via an identifier such as its start address) and its current version number, and contain the compressive sample (encoding) of the current memory block.
- Method Redirection: This is sent from the shim to the cloud daemon. It may contain the name or identifier of the object method being offloaded, and object method parameters (e.g., pointer addresses to other objects resident in a shim-managed memory block).
- Method Response: This is sent from the cloud daemon in response to a method redirection message. It may contain the return value of an offloaded method executed by the daemon or an error value.

The following provides some example performance results and/or tradeoffs, although other results may be realized as well.

Replication latency limits the range of workload sizes that can be offloaded to the cloud; the lower we can drive latency, the wider the range and the more responsive the system will feel. However, minimizing replication latency is not straightforward because its constituent parts—encoding time, network transmission time, and decoding time—are not independent. For example, achieving a fast encoding time could give a worse compression ratio, which may drive up network bandwidth utilization. The following describes resource trade-offs that may provide a reasonable performance.

Since compressive (pDCT) encoding may incur no network overhead, a fair comparison might be against blind compression of an entire memory block by zlib or snappy. The compressed block is transmitted over the network to a cloud server, where it is decompressed and used to overwrite its replica. As another point of comparison, pDCT encoding is performed and then the resulting encoding is further compressed using snappy (pDCT+snappy).

Figure 2:
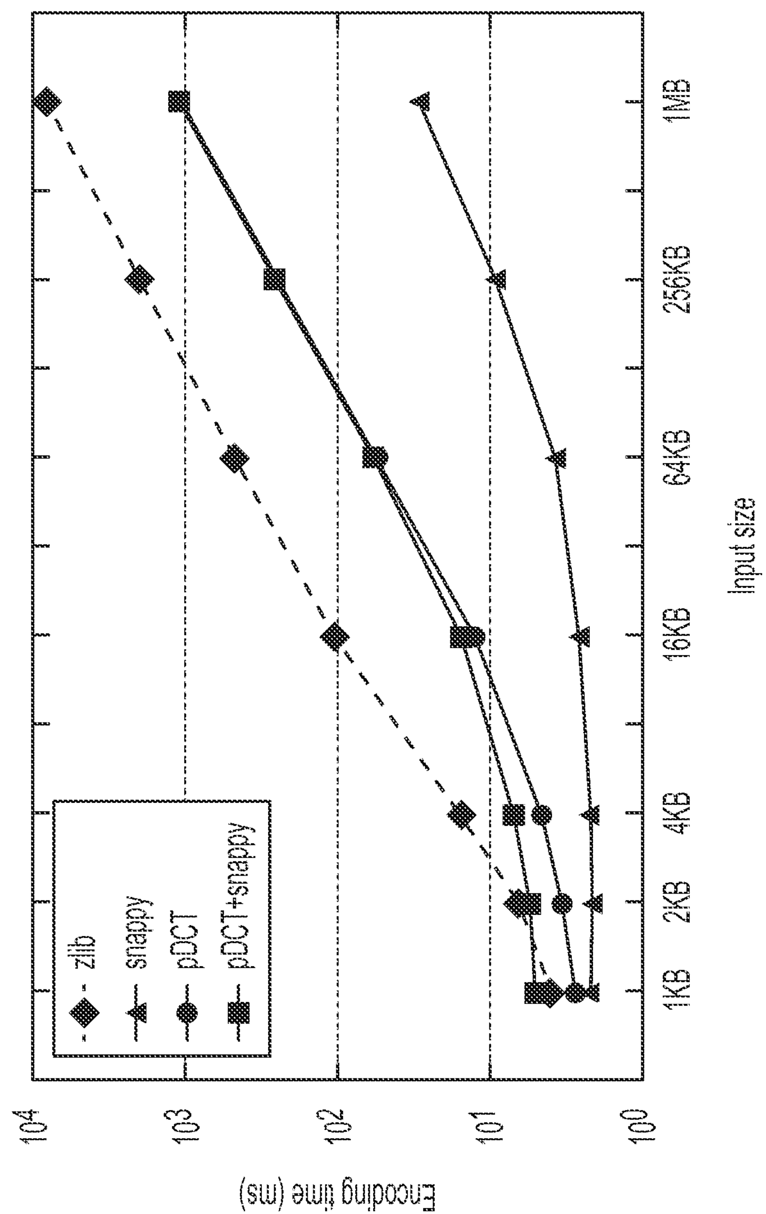
FIGS. 2 and 3 show example results.

FIG. 2 shows the average encoding time on the iPad of each of the candidate encoding methods—zlib, snappy, pDCT, and pDCT+snappy—across different memory block sizes N (denoted as Input size) with k/N=0.01. For the pDCT methods, we took M=7 k samples, which is a very conservative sampling rate; snappy encoding is fastest, and zlib is slowest, with pDCT and pDCT+snappy falling in the middle. For example, when N=64 KB, snappy requires 4 ms, zlib 487 ms, and pDCT and pDCT+snappy roughly 53 ms. We use N=64 KB throughout the rest of this evaluation because it may represent a reasonable memory block size and gives fair encoding and decoding times for all the methods.

Next, decoding time is considered. Here, recall that compressive replication trades a low complexity encoder for a high complexity decoder. Whereas zlib and snappy have negligible decoding times on an Amazon server, the compressive decoding takes on average 70 ms to decode N=64 KB. Table 1 below summarizes the total latency estimates for snappy, zlib and pDCT+snappy when we assume a 802.11g uplink transmission rate of 54 Mbps and estimate a one-way Internet routing delay of 10 ms per 1500-byte packet from the iPad to our Amazon server. Just looking at the total latencies, it is tempting to conclude that snappy has bested all the other methods. However, a different conclusion emerges when we also take into consideration the compression ratio. Here, pDCT+snappy outperforms snappy significantly, reducing bandwidth utilization 52% while giving up only 116 ms in latency and providing us better trade-off between latency and compression ratio than the other methods.

TABLE 1

Table 1: Breakdown of the worst-case total latency of a memory block synchronization update using either snappy, zlib or pDCT + snappy. All latencies shown are in milliseconds. We assume an uplink transmission rate of 54 Mbps and a one-way routing delay of 10 ms. We also show the achieved compression ratios (CR) and the size in KB of a single encoded update for each scheme, respectively.

| | Enc | Tx | Dec | Tot | CR | Size |
|---|---|---|---|---|---|---|
| snappy | 4 | 15 | — | 19 | 3.8:1 | 17.2 |
| zlib | 487 | 13 | — | 500 | 6.0:1 | 10.9 |
| pDCT + snappy | 53 | 12 | 70 | 135 | 7.3:1 | 9.0 |

To demonstrate that our prototype system may produce practical performance gains, an example iOS application was used that performs handwriting recognition of for example Chinese characters, although other applications may be used as well. In this example, Chinese handwriting recognition was selected mainly because each character is written with a prescribed number of strokes; thus, stroke count provides a quantifiable measure of the computational complexity of the recognition task.

The mobile application may be implemented based on the open source Zinnia and Tegaki projects, which provide a trained support vector machine model for recognizing traditional Chinese characters. The user handwrites a Chinese character on the tablet screen and the app captures the strokes as a series of stroke vectors in an in-memory object. This stroke vector object is then fed into a model evaluation object method, producing a classification and thus the Unicode character. When the stroke vector object is upshift_alloc'd, the data are replicated and the model evaluation method is offloaded to the cloud server.

Figure 3A:
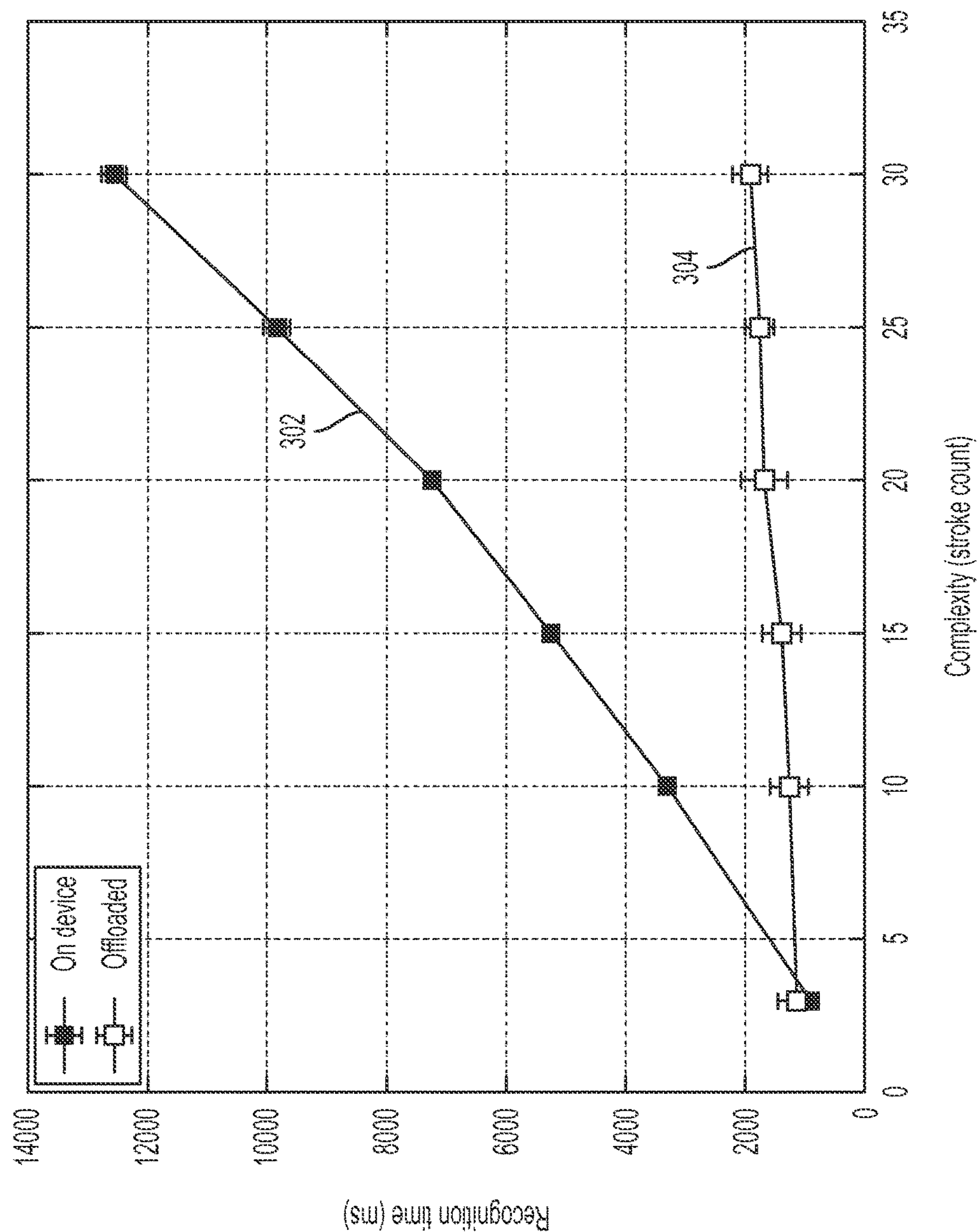

In a performance test, a comparison is made of the time required to recognize handwritten characters of increasing complexity locally on the iPad vs. offloaded to a cloud server. As shown in FIG. 3*a*, when the on-device (302) is compared to the offloaded (304) recognition times, compressive offloading actually increases the recognition time for the lowest complexity (3-stroke) characters (on-device average: 922 ms, offloaded average: 1165 ms). This is expected, due to the offloading overhead. However, the figure also shows that on-device computation time scales poorly with complexity; as character complexity increases 10-fold (from a stroke count of 3 to 30), the average on-device recognition time increases 13.62-fold. When offloaded, the increase is just 1.65-fold. Much of this attractive slow-growth behavior of compressive offloading can be attributed to the raw computing capacity of the Amazon EC2 server, but the point to emphasize here is that such computing power is only effectively utilized because compressive replication has a low overhead.

Figure 3B:
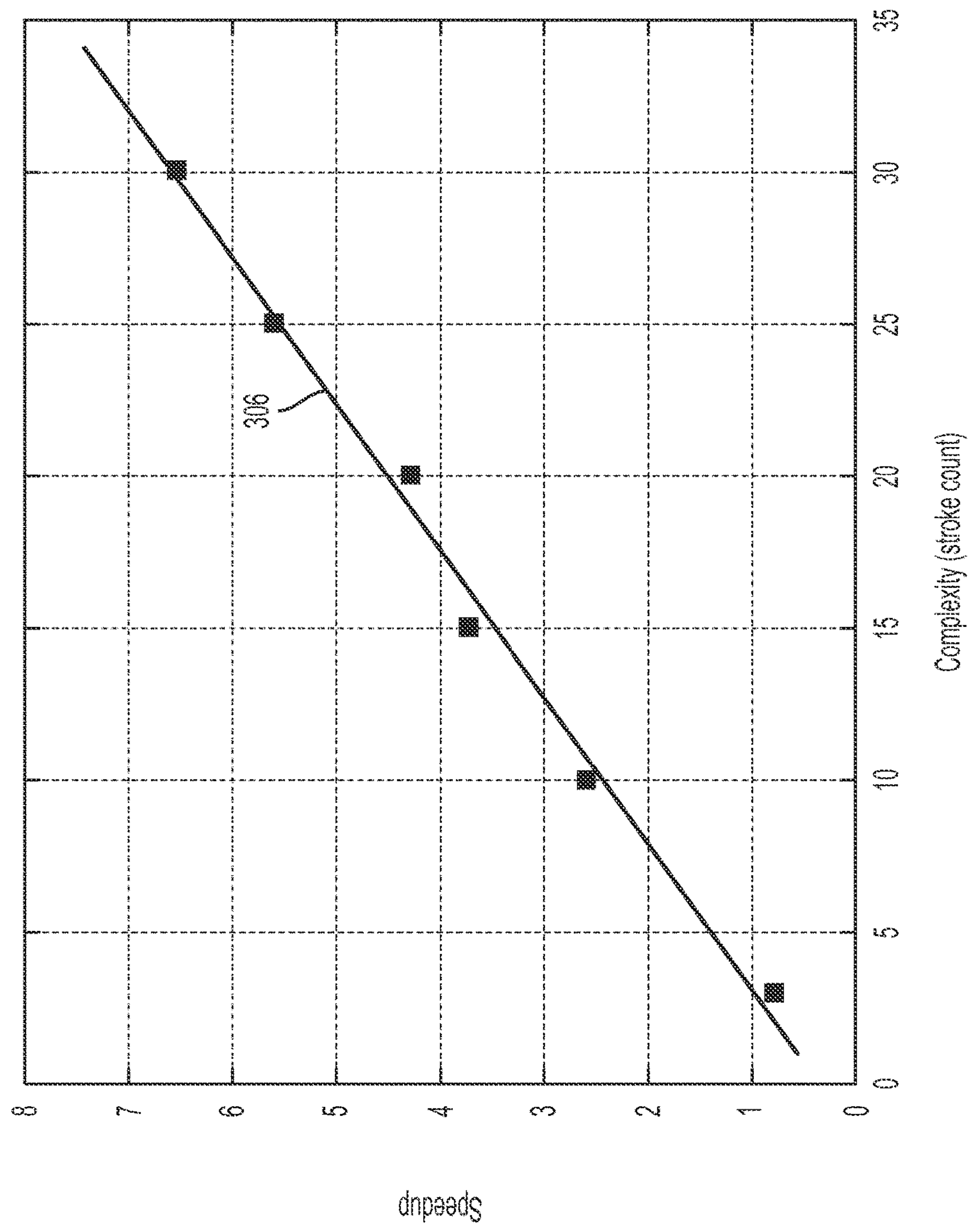

Compressive offloading may provide significant performance acceleration. Even for moderately complex 20-stroke characters, the on-device recognition time averages 7,249 ms; compressive offloading averages just 1,687 ms, which is a substantial 4.2-fold speedup. Better still, the acceleration (306) increases as the complexity increases, as shown in FIG. 3*b*. For high-complexity 30-stroke characters, the speedup due to offloading is more than 6.5-fold. The difference to the app user equipment may be striking, especially when more than one character must be recognized at a time (e.g., in a tract of handwritten text).

Figure 3C:
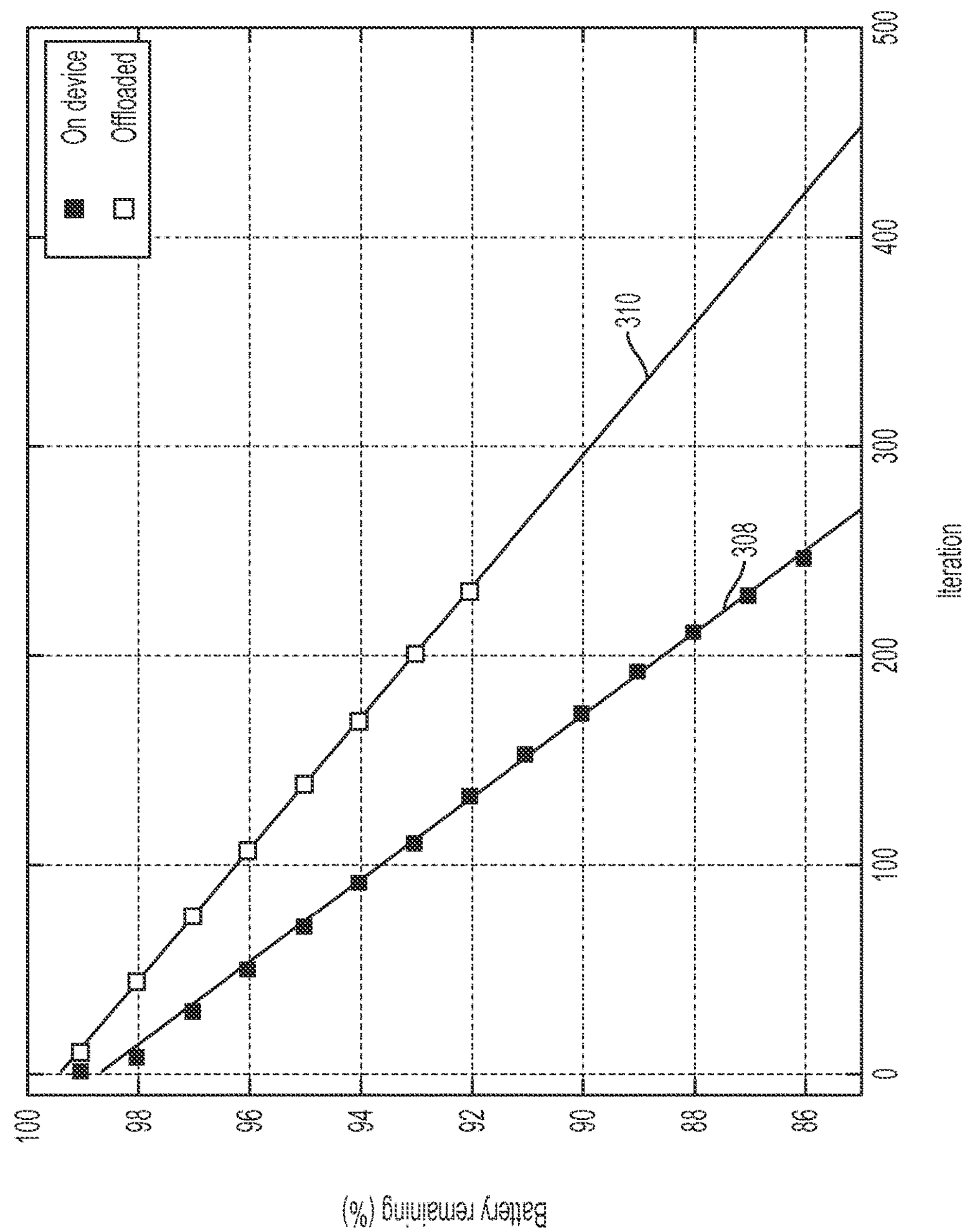

While the acceleration achievable through compressive offloading may be considered substantial, to be practical, it may not be a result of greater battery utilization. Thus, we consider the battery efficiency of compressive offloading and took into account the power drawn for computing the encoding and transmitting it over Wi-Fi. FIG. 3*c* compares the battery utilization when this experiment is run on-device (308) and offloaded (310). With compressive offloading, the battery depletion rate is reduced substantially. In fact, as the linear regression lines show, with the same battery budget, compressive offloading allows the user to perform 60% more recognition tasks. Taken together, these results show that compressive offloading is win-win for end users: it can provide significant advantages in both speed and battery efficiency for real-world mobile apps.

For the cloud provider, computations that for example take the iPad an excruciatingly long 10 seconds to execute take barely a few hundred milliseconds. At scale, these small workloads can be load-balanced to fill slack anywhere in the data center.

Example 1 may be a mobile computing device, comprising: one or more processors; and memory coupled with the one or more processors. The mobile computing device may further comprise a shim layer to compressively replicate memory blocks of the memory to a cloud server, compressively offload invocations of object methods of objects resident in a memory block of the memory to the cloud server, and to receive execution results of the invoked object methods.

Example 2 may be example 1, wherein the shim layer may include a replication agent to compressively replicate memory blocks of the memory to the cloud server continuously every t units of time.

Example 3 may be example 2, wherein the replication agent may apply a sampling matrix $\Phi$ to a memory block s to generate an encoding y of the memory block s.

Example 4 may be example 3, wherein the replication agent may apply a partial discrete cosine transform matrix $\Phi$ to the memory block s to generate the encoding y of the memory block s.

Example 5 may be example 3, wherein the replication agent may further transmit encoding y to the cloud server.

Example 6 may be example 5, wherein the replication agent may further compress encoding y to reduce its size prior to transmitting encoding y to the cloud server.

Example 7 may be any one of examples 1-6, wherein the shim layer may include an object method offloader to redirect invocation of object methods to the cloud server, and to receive execution results of the invoked object methods.

Example 8 may be example 7, wherein the object method offloader may determine whether an object of an object method being invoked is allocated from a replicated memory block.

Example 9 may be example 8, wherein the object method offloader may cause the object method to be invoked and executed on the mobile computing device, on determination that the object of the object method being invoked is not allocated from a replicated memory block.

Example 10 may be example 8, wherein the object method offloader may compressively encode a memory block associated with the object method being invoked, send the compressively encoded memory block to a cloud server, and redirect the object method to be invoked and executed on the cloud server, on determination that the object of the object method being invoked is allocated from a replicated memory block.

Example 11 may be example 10, wherein the object method offloader may apply a sampling matrix Φ to a memory block s to generate a compressive encoding y of the memory block s.

Example 12 may be example 11, wherein the object method offloader may apply a partial discrete cosine transform matrix Φ to the memory block s to generate the compressive encoding y of the memory block s.

Example 13 may be example 11, wherein the object method offloader may further transmit the compressive encoding y to the cloud server.

Example 14 may be example 13, wherein the object method offloader may further compress the compressive encoding y to reduce its size prior to transmitting encoding y to the cloud server.

Example 15 may be a method for mobile computing, comprising: compressively replicating, by a mobile computing device, memory blocks of memory of the mobile computing device to a cloud server; and monitoring, by the mobile computing device, for object method invocations. The method may further comprise on detection of an invocation of an object method, selectively redirecting, by the computing device, the invocation of the object method to the cloud server to cause the object method to be invoked and executed on the cloud server; and receiving, by the computing device, execution results of the object methods which invocations are redirected to the cloud server.

Example 16 may be example 15, wherein compressively replicating may comprise compressively replicating memory blocks of the memory to the cloud server continuously every t units of time.

Example 17 may be example 16, wherein compressively replicating may comprise applying a sampling matrix Φ to a memory block s to generate an encoding y of the memory block s.

Example 18 may be example 17, wherein compressively replicating may comprise applying a partial discrete cosine transform matrix Φ to the memory block s to generate the encoding y of the memory block s.

Example 19 may be example 17, wherein compressively replicating further may comprise transmitting encoding y to the cloud server.

Example 20 may be example 19, wherein compressively replicating further may comprise compressing encoding y to reduce its size prior to transmitting encoding y to the cloud server.

Example 21 may be any one of examples 15-20, wherein selectively redirecting may comprise determining whether an object of an object method being invoked is allocated from a replicated memory block.

Example 22 may be example 21, wherein selectively redirecting may comprise causing the object method to be invoked and executed on the mobile computing device, on determination that the object of the object method being invoked is not allocated from a replicated memory block.

Example 23 may be example 21, wherein selectively redirecting may comprise compressively encoding a memory block associated with the object method being invoked, sending the encoding of the memory block to the cloud server, and redirecting the object method to be invoked and executed on the cloud server, on determining that the object of the object method being invoked is allocated from a replicated memory block.

Example 24 may be example 23, wherein compressively encoding may comprise applying a sampling matrix Φ to a memory block s to generate a compressive encoding y of the memory block s.

Example 25 may be example 24, wherein compressively encoding may comprise applying a partial discrete cosine transform matrix Φ to the memory block s to generate the compressive encoding y of the memory block s.

Example 26 may be example 24, wherein selectively redirecting further may comprise transmitting the compressive encoding y to the cloud server.

Example 27 may be example 26, wherein selectively redirecting further may comprise compressing the compressive encoding y to reduce its size prior to transmitting encoding y to the cloud server.

Example 28 may be one or more computer-readable media having instructions stored thereon that cause a mobile computing device, in response to execution by the mobile computing device, to: compressively replicate memory blocks of memory of the mobile computing device to a cloud server; selectively redirect invocation of object methods to the cloud server; and receive execution results of the invoked object methods which invocations are redirected to the cloud server.

Example 29 may be example 28, wherein to compressively replicate may comprise to compressively replicate memory blocks of the memory to the cloud server continuously every t units of time.

Example 30 may be example 29, wherein to compressively replicate may comprise to apply a sampling matrix Φ to a memory block s to generate an encoding y of the memory block s.

Example 31 may be example 30, wherein to apply may comprise to apply a partial discrete cosine transform matrix Φ to the memory block s to generate the encoding y of the memory block s.

Example 32 may be example 30, wherein to compressively replicate further may comprise to transmit encoding y to the cloud server.

Example 33 may be example 32, wherein to compressively replicate further may comprise to compress encoding y to reduce its size prior to transmitting encoding y to the cloud server.

Example 30 may be any one of examples 28-33, wherein to selectively redirect may comprise to determine whether an object of an object method being invoked is allocated from a replicated memory block.

Example 35 may be example 34, wherein to selectively redirect may comprise to cause the object method to be invoked and executed on the mobile computing device, on determination that the object of the object method being invoked is not allocated from a replicated memory block.

Example 36 may be example 34, wherein to selectively redirect may comprise to compressively encode a memory block associated with the object method being invoked, send the compressively encode memory block to a cloud server, and redirect the object method to be invoked and executed on the cloud server, on determination that the object of the object method being invoked is allocated from a replicated memory block.

Example 37 may be example 36, wherein to compressively encode may comprise to apply a sampling matrix Φ to a memory block s to generate a compressive encoding y of the memory block s.

Example 38 may be example 37, wherein to apply may comprise to apply a partial discrete cosine transform matrix Φ to the memory block s to generate the compressive encoding y of the memory block s.

Example 39 may be example 37, wherein to selectively redirect further may comprise to transmit the compressive encoding y to the cloud server.

Example 40 may be example 39, wherein to selectively redirect further may comprise to compress the compressive encoding y to reduce its size prior to transmitting encoding y to the cloud server.

Example 41 may be an apparatus for mobile computing, comprising: one or more processors; memory coupled with the one or more processors; means for compressively replicating memory pages of the memory to a cloud server; means for monitoring for object method invocations; means for selectively redirecting the invocation of the object method to the cloud server to cause the object method to be invoked and executed on the cloud server, on detection of an invocation of an object method; and means for receiving execution results of the object methods which invocations are redirected to the cloud server.

Example 42 may be example 41, wherein means for compressively replicating may comprise means for compressively replicating memory blocks of the memory to the cloud server continuously every t units of time.

Example 43 may be example 42, wherein means for compressively replicating may comprise means for applying a sampling matrix Φ to a memory block s to generate an encoding y of the memory block s.

Example 44 may be example 43, wherein means for compressively replicating may comprise means for applying a partial discrete cosine transform matrix Φ to the memory block s to generate the encoding y of the memory block s.

Example 45 may be example 43, wherein means for compressively replicating further may comprise means for transmitting encoding y to the cloud server.

Example 46 may be example 45, wherein means for compressively replicating further may comprise means for compressing encoding y to reduce its size prior to transmitting encoding y to the cloud server.

Example 47 may be any one of examples 41-46, wherein means for selectively redirecting may comprise means for determining whether an object of an object method being invoked is allocated from a replicated memory block.

Example 48 may be example 47, wherein means for selectively redirecting may comprise means for causing the object method to be invoked and executed on the mobile computing device, on determination that the object of the object method being invoked is not allocated from a replicated memory block.

Example 49 may be example 47, wherein means for selectively redirecting may comprise means for compressively encoding a memory block associated with the object method being invoked, sending the encoding of the memory block to the cloud server, and means for redirecting the object method to be invoked and executed on the cloud server, on determining that the object of the object method being invoked is allocated from a replicated memory block.

Example 50 may be example 49, wherein means for compressively encoding may comprise means for applying a sampling matrix Φ to a memory block s to generate a compressive encoding y of the memory block s.

Example 51 may be example 50, wherein means for compressively encoding may comprise means for applying a partial discrete cosine transform matrix Φ to the memory block s to generate the compressive encoding y of the memory block s.

Example 52 may be example 50, wherein means for selectively redirecting further may comprise means for transmitting the compressive encoding y to the cloud server.

Example 53 may be example 52, wherein means for selectively redirecting further may comprise means for compressing the compressive encoding y to reduce its size prior to transmitting encoding y to the cloud server.

Example 54 may be a cloud server, comprising: one or more processors; memory coupled with the one or more processors; and a cloud daemon to receive encodings of memory blocks of memory compressively replicated from one or more mobile devices, and invocations of object methods redirected from the one or more mobile devices; to decode the encodings and update corresponding memory blocks on the cloud server; and to invoke and execute the object methods on the cloud server, and return execution results of the invoked object methods to the one or more mobile devices.

Example 55 may be example 54, wherein the cloud daemon may comprise a replication agent to receive compressively encoded memory blocks of memory from one or more mobile devices, encode corresponding replica memory blocks on the cloud server, determine and decode to recover updates to the replicate memory blocks, and apply the recovered updates to the replica memory blocks on the cloud server, continuously every t units of time.

Example 56 may be example 55, wherein the replication agent may apply a sampling matrix Φ to a replica memory block to generate an encoding $y_{i-1}$ of the replica memory block.

Example 57 may be example 56, wherein the replication agent may apply a partial discrete cosine transform matrix Φ to the replica memory block to generate the encoding $y_{i-1}$ of the replica memory block.

Example 58 may be example 56, wherein the replication agent may further receive a compressive encoding $y_i$ of the replicated memory block, and calculate a compressively encoded update $y'=y_{i-1}-y_i$ to the replica memory block.

Example 59 may be example 58, wherein the replication agent may further decode the compressively encoded update y' to recover an update Δs to the replica memory block, and to apply the update Δs to the replica memory block.

Example 60 may be example 59, wherein the compressive encoding $y_i$ is compressed to reduce its size, and the replication agent may further decompress the compressed compressive encoding $y_i$ before calculating the compressively encoded update y'.

Example 61 may be one of examples 54-60, wherein the cloud daemon includes an object method servicer to receive invocations of object methods redirected from the one or more mobile devices; and to invoke and execute the object methods, and return execution results of the invoked object methods to the one or more mobile devices.

Example 62 may be example 61, wherein the object method servicer may translate an object pointer to a location in an address space of a mobile device to an object pointer to a location in an address space of the cloud server.

Example 63 may be example 61, wherein the object method servicer may serialize the execution results of the invoked object methods, and return the serialized execution results to the one or more mobile devices.

Example 64 may be a method for cloud computing, comprising: receiving, by a cloud server, encodings of memory blocks of memory compressively replicated from one or more mobile devices; decoding, by the cloud server, the encodings, and updating corresponding replica memory blocks of the cloud server; receiving, by the cloud server, invocations of object methods redirected from the one or more mobile devices; invoking and executing, by the cloud server, the object methods; and returning, by the cloud server, execution results of the invoked object methods to the one or more mobile devices.

Example 65 may be example 64, wherein receiving encodings may comprise receiving compressively encoded memory blocks of memory from one or more mobile devices; encoding corresponding replica memory blocks on the cloud server; determining and decoding to recover updates to the replicate memory blocks; and applying the recovered updates to the replica memory blocks on the cloud server, continuously every t units of time.

Example 66 may be example 65, wherein encoding corresponding replica memory blocks may comprise applying a sampling matrix $\Phi$ to a replica memory block to generate an encoding $y_{i-1}$ of the replica memory block.

Example 67 may be example 66, wherein applying may comprise applying a partial discrete cosine transform matrix $\Phi$ to the replica memory block to generate the encoding $y_{i-1}$ of the replica memory block.

Example 68 may be example 66, wherein determining updates may comprise receiving a compressive encoding $y_i$ of the replicated memory block, and calculating a compressively encoded update $y'=y_{i-1}-y_i$ to the replica memory block.

Example 69 may be example 68, wherein decoding may comprise decoding the compressively encoded update y' to recover an update $\Delta s$ to the replica memory block.

Example 70 may be example 69, wherein the compressive encoding $y_i$ is compressed to reduce its size, and decoding further may comprise decompressing the compressed compressive encoding $y_i$ before calculating the compressively encoded update y'.

Example 71 may be example 64, wherein invoking may comprise translating an object pointer to a location in an address space of a mobile device to an object pointer to a location in an address space of the cloud server.

Example 72 may be any one of examples 64-71, wherein returning may comprise serializing the execution results of the invoked object methods, and returning the serialized execution results to the one or more mobile devices.

Example 73 may be one or more computer-readable media having instructions stored thereon that cause a cloud server, in response to execution by the cloud server, to: receive encodings of memory blocks of memory compressively replicated from one or more mobile devices; decode the encodings and update corresponding replica memory blocks on the cloud server; receive invocations of object methods offloaded from the one or more mobile devices; and invoke and execute the object methods, and return execution results of the invoked object methods to the one or more mobile devices.

Example 74 may be example 73, wherein to receive encodings, to decode and to update may comprise to receive compressively encoded memory blocks of memory from one or more mobile devices, to encode corresponding replica memory blocks on the cloud server, to determine and decode to recover updates to the replicate memory blocks, and to apply the recovered updates to the replica memory blocks on the cloud server, continuously every t units of time.

Example 75 may be example 74, wherein to apply may comprise to apply a sampling matrix $\Phi$ to a replica memory block to generate an encoding $y_{i-1}$ of the replica memory block.

Example 76 may be example 75, wherein to apply may comprise to apply a partial discrete cosine transform matrix $\Phi$ to the replica memory block to generate the encoding $y_{i-1}$ of the replica memory block.

Example 77 may be example 75, wherein to determine may comprise to further receive a compressive encoding $y_i$ of the replicated memory block, and calculate a compressively encoded update $y'=y_{i-1}-y_i$ to the replica memory block.

Example 78 may be example 77, wherein to decide may comprise to decode the compressively encoded update y' to recover an update $\Delta s$ to the replica memory block.

Example 79 may be example 78, wherein the compressive encoding $y_i$ is compressed to reduce its size, and to decode further comprise to decompress the compressed compressive encoding $y_i$ before calculating the compressively encoded update y'.

Example 80 may be example 73, wherein to receive invocations and to invoke and execute may comprise to translate an object pointer to a location in an address space of a mobile device to an object pointer to a location in an address space of the cloud server.

Example 81 may be any one of examples 73-80, wherein to return may comprise to serialize the execution results of the invoked object methods, and transmit the serialized execution results to the one or more mobile devices.

Example 82 may be a cloud server, comprising: one or more processors; memory coupled with the one or more processors; and means for receiving encodings of memory blocks of memory compressively replicated from one or more mobile devices; means for decoding, by the cloud server, the encodings, and updating corresponding replica memory blocks of the memory; means for receiving invocations of object methods redirected from the one or more mobile devices; means for invoking and executing, by the cloud server, the object methods; and means for returning execution results of the invoked object methods to the one or more mobile devices.

Example 83 may be example 82, wherein means for receiving encodings may comprise means for receiving compressively encoded memory blocks of memory from one or more mobile devices; means for encoding corresponding replica memory blocks on the cloud server; means for determining and decoding to recover updates to the replicate memory blocks; and means for applying the recovered updates to the replica memory blocks on the cloud server, continuously every t units of time.

Example 83 may be example 83, wherein means for encoding corresponding replica memory blocks may comprise means for applying a sampling matrix $\Phi$ to a replica memory block to generate an encoding $y_{i-1}$ of the replica memory block.

Example 85 may be example 84, wherein means for applying may comprise means for applying a partial discrete cosine transform matrix $\Phi$ to the replica memory block to generate the encoding $y_{i-1}$ of the replica memory block.

Example 86 may be example 84, wherein means for determining updates may comprise means for receiving a compressive encoding $y_i$ of the replicated memory block, and means for calculating a compressively encoded update $y'=y_{i-1}-y_i$ to the replica memory block.

Example 87 may be example 86, wherein means for decoding may comprise means for decoding the compressively encoded update y' to recover an update Δs to the replica memory block.

Example 88 may be example 87, wherein the compressive encoding $y_i$ is compressed to reduce its size, and means for decoding further may comprise means for decompressing the compressed compressive encoding $y_i$ before calculating the compressively encoded update y'.

Example 89 may be example 82, wherein means for invoking may comprise means for translating an object pointer to a location in an address space of a mobile device to an object pointer to a location in an address space of the cloud server.

Example 90 may be any one of examples 82-89, wherein means for returning may comprise means for serializing the execution results of the invoked object methods, and means for returning the serialized execution results to the one or more mobile devices.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term “machine-readable medium” refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term “machine-readable signal” refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other implementations may be within the scope of the following claims. Furthermore, the specific values provided in the foregoing are merely examples and may vary in some implementations.

Although various aspects of the invention are set out in the claims, other aspects of the invention comprise other combinations of features from the described implementations with the features of the claims, and not solely the combinations explicitly set out in the claims.

It is also noted herein that while the above describes example implementations of the invention, these descriptions should not be viewed in a limiting sense. Rather, there are several variations and modifications that may be made without departing from the scope of the present invention as defined in the appended claims.

What is claimed is:

1. A mobile computing device, comprising:

one or more processors;

memory coupled with the one or more processors;

a shim layer, including a replication agent, to compressively replicate memory blocks of the memory to a cloud server, selectively offload invocations of object methods of objects resident in a memory block of the memory to the cloud server for execution, and to receive from the cloud server execution results of the invoked object methods that are selectively offloaded to the cloud server;

wherein compressively replicate is based on compressive sensing, a random sampling technique in which a memory block s is sampled or encoded in view of its sparsity rate k/N, where k is a number of non-zero blocks in s, and N is a size of a dimension of a M×N sampling matrix ϕ;

wherein the replication agent is to compressively replicate memory blocks of the memory to the cloud server continuously.

2. The mobile computing device of claim 1, wherein the replication agent is to compressively replicate memory blocks of the memory to the cloud server continuously every t units of time.

3. The mobile computing device of claim 1, wherein to compressively replicate memory block s, the replication agent is to apply the sampling matrix ϕ to the memory block s to generate an encoding y of the memory block s, and to transmit encoding y to the cloud server, where s is a member of $R^N$ with the sparsity rate of k/N, and y is a member of $R^M$.

4. The mobile computing device of claim 3, wherein the sampling matrix ϕ is a partial discrete cosine transform matrix applied to the memory block s to generate the encoding y of the memory block s.

5. The mobile computing device of claim 1, wherein the shim layer includes an object method offloader to redirect invocation of object methods to the cloud server, and to receive execution results of the invoked object methods.

6. The mobile computing device of claim 5, wherein the object method offloader is to determine whether an object of an object method being invoked is allocated from a replicated memory block.

7. The mobile computing device of claim 6, wherein the object method offloader is to cause the object method to be invoked and executed on the mobile computing device, on determination that the object of the object method being invoked is not allocated from a replicated memory block.

8. The mobile computing device of claim 6, wherein the object method offloader is to compressively encode a memory block associated with the object method being invoked, send the compressively encoded memory block to a cloud server, and redirect the object method to be invoked and executed on the cloud server, on determination that the object of the object method being invoked is allocated from a replicated memory block.

9. One or more non-transitory computer-readable media having instructions stored thereon that cause a mobile computing device, in response to execution by the mobile computing device, to:

compressively replicate, with a replication agent of a shim layer, memory blocks of memory of the mobile computing device to a cloud server;

selectively redirect invocation of object methods to the cloud server for execution; and receive from the cloud server execution results of the invoked object methods which invocations are redirected to the cloud server;

wherein compressively replicate is based on compressive sensing, a random sampling technique in which a memory block s is sampled or encoded in view of its sparsity rate k/N, k is a number of non-zero blocks in s, and N is a size of a dimension of a M×N sampling matrix ϕ;

wherein to compressively replicate comprises to compressively replicate memory blocks of the memory to the cloud server continuously.

10. The computer-readable media of claim 9, wherein to compressively replicate comprises to compressively replicate memory blocks of the memory to the cloud server continuously every t units of time.

11. The computer-readable media of claim 9, wherein to compressively replicate comprises to apply the sampling matrix ϕ to the memory block s to generate an encoding y of the memory block s; and to transmit encoding y to the cloud server, where s is a member of $R^N$ with the sparsity rate of k/N, and y is a member of $R^M$.

12. The computer-readable media of claim 11, wherein to apply the sampling matrix ϕ comprises to apply a partial discrete cosine transform matrix ϕ to the memory block s to generate the encoding y of the memory block s.

13. The computer-readable media of claim 9, wherein to selectively redirect comprises to determine whether an object of an object method being invoked is allocated from a replicated memory block.

14. The computer-readable media of claim 13, wherein to selectively redirect comprises to cause the object method to be invoked and executed on the mobile computing device, on determination that the object of the object method being invoked is not allocated from a replicated memory block.

15. The computer-readable media of claim 13, wherein to selectively redirect comprises to compressively encode a memory block associated with the object method being invoked, send the compressively encoded memory block to a cloud server, and redirect the object method to be invoked and executed on the cloud server, on determination that the object of the object method being invoked is allocated from a replicated memory block.

16. A cloud server, comprising:

one or more processors;

memory coupled with the one or more processors;

a cloud daemon to receive encodings of memory blocks of memory compressively replicated from one or more mobile devices by corresponding one or more replication agents of one or more shim layers of the one or more mobile devices, and invocations of object methods redirected from the one or more mobile devices; and to invoke and execute the object methods on the cloud server, and return execution results of the invoked object methods to the one or more mobile devices;

wherein the memory blocks are compressively replicated based on compressive sensing, a random sampling technique in which a memory block s is sampled or encoded in view of its sparsity rate k/N, k is a number of non-zero blocks in s, and N is a size of a dimension of a M×N sampling matrix ϕ;

wherein the memory blocks are compressively replicated continuously.

17. The cloud server of claim 16, wherein the cloud daemon further receives new encodings of some of the same compressively replicated memory blocks of memory from the corresponding one or more replication agents of the one or more shim layers of the one or more mobile devices, and the cloud daemon further comprises a replication agent to process the further received new encodings of the memory blocks to recover updates to the previously received compressively replicated memory blocks, and apply the recovered updates to the previously received compressively replicated memory blocks on the cloud server.

18. The cloud server of claim 16, wherein an encoding y of the memory blocks is generated by applying the sampling matrix ϕ to the memory block s, where s is a member of $R^N$ with the sparsity rate of k/N, and y is a member of $R^M$.

19. The cloud server of claim 18, wherein the sampling matrix ϕ is a partial discrete cosine transform matrix ϕ applied to the memory block s to generate the encoding y of the memory block s.

20. The cloud server of claim 18, wherein on receipt of a new encoding $y_i$ of a previously received encoding $y_{i-1}$ of one of the compressively replicated memory blocks, the replication is to calculate the update by calculating $y'=y_{i-1}-y_i$ for the compressively replicated memory block.

21. The cloud server of claim 20, wherein the replication agent is to further decode the update y' to recover an update Δs to the compressively replicated memory block, and to apply the update Δs to the compressively replicated memory block.

22. The cloud server of claim 16, wherein the cloud daemon includes an object method servicer to receive invocations of object methods redirected from the one or more mobile devices; and to invoke and execute the object methods, and return execution results of the invoked object methods to the one or more mobile devices.

23. The cloud server of claim 22, wherein the object method servicer is to translate an object pointer to a location in an address space of a mobile device to an object pointer to a location in an address space of the cloud server; and to serialize the execution results of the invoked object methods, and return the serialized execution results to the one or more mobile devices.

24. One or more non-transitory computer-readable media having instructions stored thereon that cause a cloud server, in response to execution by the cloud server, to:

receive encodings of memory blocks of memory compressively replicated from one or more mobile devices by corresponding one or more replication agents of one or more shim layers of the one or more mobile devices;

receive invocations of object methods offloaded from the one or more mobile devices; and invoke and execute the object methods, and return execution results of the invoked object methods to the one or more mobile devices;

wherein the memory blocks are compressively replicated based on compressive sensing, a random sampling technique in which a memory block s is sampled or encoded in view of its sparsity rate k/N, k is a number of non-zero blocks in s, and N is a size of a dimension of a M×N sampling matrix ϕ;

wherein the memory blocks are compressively replicated continuously.

25. The computer-readable media of claim 24, wherein to receive invocations and to invoke and execute comprises to translate an object pointer to a location in an address space of a mobile device to an object pointer to a location in an address space of the cloud server; and wherein to return comprises to serialize the execution results of the invoked object methods, and transmit the serialized execution results to the one or more mobile devices.

26. The mobile computing device of claim 1, wherein M=N.

27. The cloud server of claim 16, wherein M=N.

* * * * *